US008761021B2

(12) United States Patent
Ray et al.

(10) Patent No.: US 8,761,021 B2
(45) Date of Patent: Jun. 24, 2014

(54) LOAD DISTRIBUTION IN A NETWORK OF SMALL-CELL BASE STATIONS

(75) Inventors: Siddharth Ray, Palo Alto, CA (US); Murari Srinivasan, Palo Alto, CA (US); Milo Steven Medin, Redwood City, CA (US)

(73) Assignee: Google Inc., Mountain View, CA (US)

( * ) Notice: Subject to any disclaimer, the term of this patent is extended or adjusted under 35 U.S.C. 154(b) by 105 days.

(21) Appl. No.: 13/604,748

(22) Filed: Sep. 6, 2012

(65) Prior Publication Data
US 2014/0064083 A1    Mar. 6, 2014

(51) Int. Cl.
H04L 12/26    (2006.01)
G06F 15/16    (2006.01)
H04L 1/00    (2006.01)

(52) U.S. Cl.
USPC ........... 370/237; 370/231; 370/232; 370/236; 709/235

(58) Field of Classification Search
CPC ....................................................... H04L 47/10
USPC ........... 370/230–232, 235, 236, 237; 709/235
See application file for complete search history.

(56) References Cited

U.S. PATENT DOCUMENTS

| | | | | |
|---|---|---|---|---|
| 6,044,249 | A * | 3/2000 | Chandra et al. ................. | 455/62 |
| 8,169,933 | B2 | 5/2012 | Srinivasan et al. | |
| 2009/0227263 | A1 | 9/2009 | Agrawal et al. | |
| 2010/0136998 | A1 | 6/2010 | Lott et al. | |
| 2010/0240368 | A1 | 9/2010 | Fox et al. | |
| 2010/0240373 | A1 | 9/2010 | Ji et al. | |
| 2010/0316012 | A1 | 12/2010 | Stanwood et al. | |
| 2011/0256880 | A1 | 10/2011 | Golaup et al. | |
| 2012/0009972 | A1 | 1/2012 | Viering et al. | |
| 2012/0058777 | A1 | 3/2012 | Nguyen et al. | |
| 2012/0063383 | A1 | 3/2012 | Barbieri et al. | |
| 2012/0094630 | A1 * | 4/2012 | Wisnewski et al. ........... | 455/405 |

FOREIGN PATENT DOCUMENTS

| | | |
|---|---|---|
| KR | 10-2012-0012865 A | 2/2012 |
| KR | 10-2012-0048716 A | 5/2012 |
| WO | WO-2009067297 A1 | 5/2009 |

OTHER PUBLICATIONS

Specification and Drawings of Unplublished U.S. Appl. No. 13/604,741, filed Sep. 6, 2012.
"A new kind of network: Open indoor femtos for both indoor and outdoor coverage", Dec. 2011, Corporate R&D, Qualcomm, pp. 1-13.
International Search Report and Written Opinion for PCT Application No. PCT/US2013/049532, dated Oct. 24, 2013.

* cited by examiner

*Primary Examiner* — Ronald Abelson
(74) *Attorney, Agent, or Firm* — Honigman Miller Schwartz and Cohn LLP

(57) ABSTRACT

A network device may make a determination that a first backhaul connection, which serves a first base station, is congested and that a second backhaul connection, which serves a second base station, is not congested. This determination may be made based on a first periodic data cap imposed (on the first backhaul connection, a traffic load on the first backhaul connection, a second periodic data cap imposed on the second backhaul connection, and a traffic load on the second backhaul connection. In response to the determination, the network device may configure a value of a cellular communication parameter utilized by one or both of the base stations. The configuration may comprise periodic adjustments of the value of the cellular communication parameter. The periodic adjustments may cause one or more mobile devices to be cyclically handed-over between the first base station and the second base station.

18 Claims, 9 Drawing Sheets

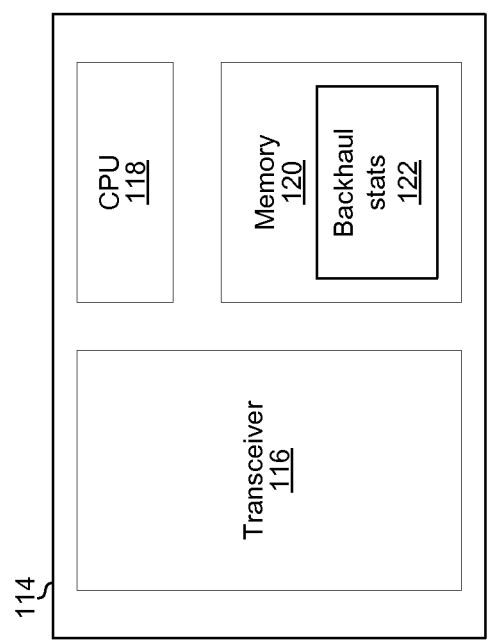

LOAD DISTRIBUTION IN A NETWORK OF SMALL-CELL BASE STATIONS

TECHNICAL FIELD

Aspects of the present application relate to wireless communications. More specifically, to a method and apparatus for load distribution in a network of small-cell base stations.

BACKGROUND

Deploying small-cell (e.g., femtocell) base stations in homes and businesses may present challenges not faced in the deployment of macrocell base stations. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A method and/or apparatus is provided for wireless communications, substantially as illustrated by and/or described in connection with at least one of the figures, as set forth more completely in the claims.

BRIEF DESCRIPTION OF THE DRAWINGS

FIG. 1C is a block diagram of an example base station manager.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. Hardware may comprise, for example, one or more processors, ASICs, and/or FPGAs. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "e.g.," introduce a list of one or more non-limiting examples, instances, or illustrations.

In an example implementation, a network device of a first service provider may make a determination that a first backhaul connection, which serves a first base station, is congested and that a second backhaul connection, which serves a second base station, is not congested. This determination may be made based on, for example, a first periodic data cap imposed (e.g., by a second service provider) on the first backhaul connection, a traffic load on the first backhaul connection, a second periodic data cap imposed (e.g., by a second service provider) on the second backhaul connection, and a traffic load on the second backhaul connection. In response to the determination, the network device may configure a value of a cellular communication parameter utilized by one or both of the base stations. The configuration may result in one or more mobile devices being handed-over from the first base station to the second base station. The configuration may also comprise periodic adjustments of the value of the cellular communication parameter. The periodic adjustments may cause one or more mobile devices to be cyclically handed-over between the first base station and the second base station.

Figure 1A:
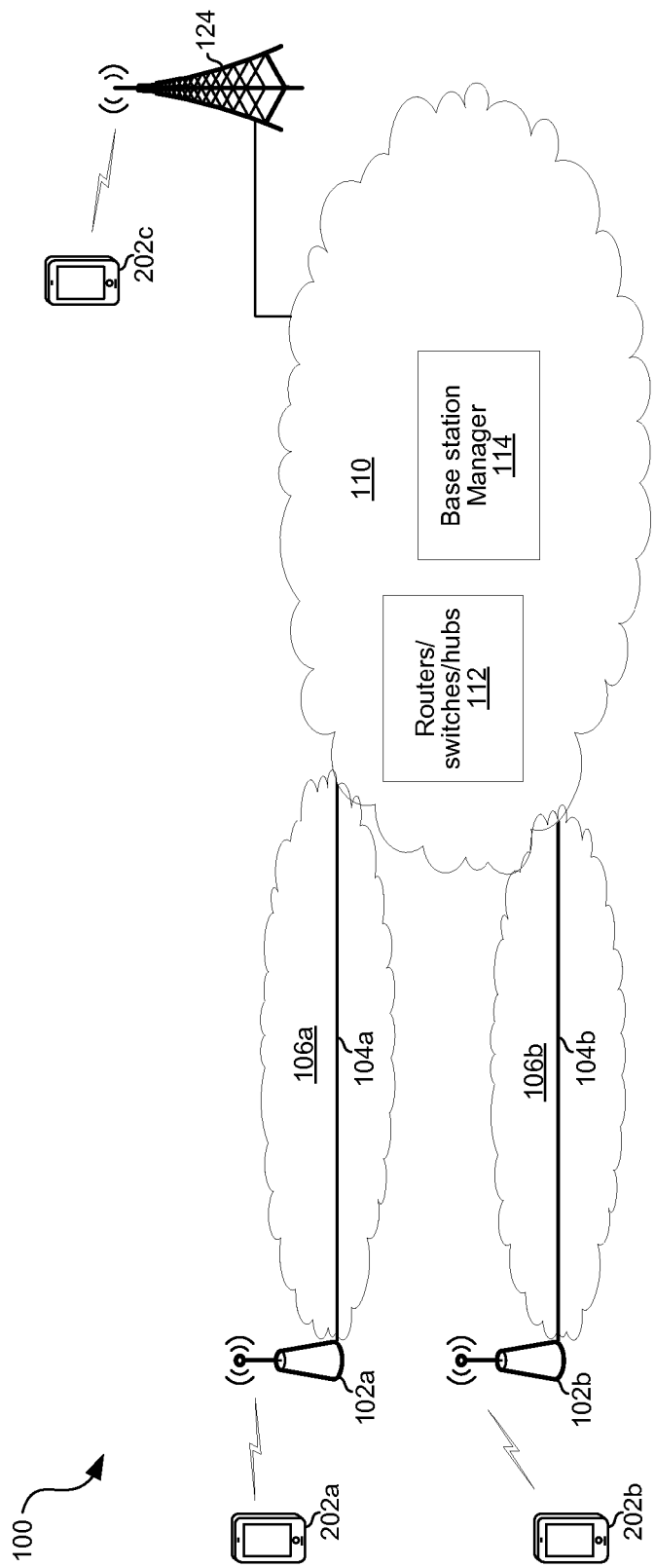
FIG. 1A depicts an example of a network comprising a plurality of small-cell base stations backhauled over data-capped network connections.

FIG. 1A depicts an example of a network comprising a plurality of small-cell base stations backhauled over data-capped network connections. The network 100 comprises base stations 102a, 102b, and 124; and subnetworks 106a, 106b, and 110.

The subnetwork 110 may be a core network of a service provider that provides network access to mobile devices. The subnetwork 110 may be, for example, a core network 110 of a cellular service provider. The core network 110 may comprise various components 112 (e.g., routers, switches, hubs, etc.) for connecting the core network to the access networks 106a and 106b and to the base station 124. The core network 110 may comprise a base station manager 114 which may operate as described herein.

Each of the base stations 102a and 102b may be operable to communicate data between mobile devices and a respective one of the subnetworks 106a and 106b. In this regard, base station 102a may communicate data between mobile device 202a and the subnetwork 106a, and base station 102b may communicate data between mobile device 202b and subnetwork 106b. In this regard, each of the base stations 102a and 102b may support any one or more wireless (e.g., Wi-Fi, LTE), wired (e.g., Ethernet, DSL), and/or optical (e.g., Fibre Channel) protocols. Each of the base stations 102a and 102b may comprise circuitry operable to implement functions of a base station described herein.

In an example implementation, the base stations 102a and 102b may be associated with the cellular provider that is associated with the core network 110. In this regard, one or more agreements may be in place between the owner(s) of the base stations 102a and 102b such that the base stations 102a and 102b are permitted to communicate on frequencies owned/leased by the cellular provider.

The connection 104a through the subnetwork 106a may carry backhaul traffic for the base station 102a. The connection 104b through the subnetwork 106b may carry backhaul traffic for the base station 102b. Each of the connections 104a and 104b may comprise one or more wired, wireless, and/or optical network links.

Each of the subnetworks 106a and 106b may be an access network of a respective Internet service provider (ISP). Accordingly, each of the base stations 102a and 102b may be associated with a contract between a subscriber and an ISP that provides one of the access networks 106a and 106b. The subnetwork 106a may be, for example, an access network of a cable television provider, where the owner and/or lessee of the base station 102a has an account with the cable television provider, and the base station 102a is associated with the contract. The subnetwork 106b may be, for example, an access network of an xDSL provider, where the owner and/or lessee of the base station 102b has an account with the xDSL provider, and the base station 102b is associated with the contract.

In an example implementation, the cellular provider may not have control, or at least not sole control, over the access networks 106a and 106b. For example, the ISPs associated with the access networks 106a and 106b may be separate entities than the cellular provider associated with the core network 110. Consequently, restrictions, such as periodic data caps and/or maximum traffic loads, imposed on the connections 104a and 104b may be, at least partially, out of the control of the cellular provider. Periodic data caps may be measured in, for example, bits or bytes. A traffic load may be measured in, for example, bits or bytes per unit time (e.g., megabits per second (Mbps) or megabytes per second (MBps)). A traffic load may be, for example, an instantaneous traffic load at one or more time instants, an average traffic load averaged over a time period (e.g., an hour, day, week, month, year, or billing period), and/or an average traffic load broken down by category (e.g., by time of day, time of week, and/or time of year).

The base station manager 114 may be operable to collect information about the backhaul connections 104a and 104b and utilize the information for managing (e.g., via a logical management interface between it and the base station 102a and/or between it and the base station 102b) the respective traffic loads on the base stations 102a and 102b. The collected information may be stored in a data structure, such as the one described below with respect to FIG. 1D, which may be part of, and/or accessible by, the base station manager 114. Collected information may be, for example, updated continuously, periodically, and/or on an event-driven basis. The base station manager 114 may comprise circuitry which resides in a single device or is distributed among a plurality of devices. In this regard, although an example implementation is depicted in which the base station manager 114 resides entirely in the core network 110, the base station manager 114 could reside entirely or partly in any one or more of the base station 102a, the base station 102b, and the core network 110.

Managing the respective traffic loads on the base stations 102a and 102b may comprise configuring one or both of the base stations 102a and 102b, by, for example, configuring a value of one or more parameters utilized by one or both of the base stations 102a and 102b. The parameters may include, for example: transmit power, receive sensitivity, channels to utilize, one or more quality of service (QoS) thresholds above and/or below which traffic is to be accepted and/or dropped, identifiers of permitted and/or denied traffic flows, whether particular base stations may accept inbound handovers, whether particular base stations should initiate outbound handovers, and/or any other parameters useful for managing the respective traffic loads on the base stations 102a and 102b.

Additionally or alternatively, configuring one or both of the base stations 102a and 102b may comprise communication of network management messages. Such messages may be communicated, for example, between the base stations 102a and 102b, between the base station 102a and the core network 110 (e.g., components 112 and/or the base station manager 114), and/or between the base station 102b and the core network 110 (e.g., components 112 and/or the base station manager 114). The network management messages may be communicated in-band and/or out-of-band with one or both of the connections 104a, as is described below with respect to FIG. 5.

The collected information may include, for example, one or more maximum permitted traffic loads for the connection 104a (which may be imposed by the ISP that provides connection 104a), and/or a one or more maximum permitted traffic loads for the connection 104b (which may be imposed by the ISP that provides connection 104b). For example, the ISP that provides connection 104a may impose a maximum downstream load of 50 Mbps, and a maximum upstream load of 10 Mbps.

The collected information may, for example, include a periodic data cap imposed on the connection 104a, and/or a periodic data cap imposed on the connection 104b. For example, the ISP that provides connection 104a may impose a monthly data cap of 250 GB and the ISP that provides connection 104b may impose a monthly data cap of 300 GB. In some instances, the periodic data cap and the maximum load of a connection may be interrelated. For example, the ISP that provides connection 104a may impose a maximum of 50 Mbps up to the first 250 GB in a billing cycle and a maximum load of 10 Mbps for amounts in excess of 250 GB in a single billing cycle.

The collected information may include, for example, a total amount of traffic communicated over the connection 104a during one or more time periods, and/or a total amount of traffic communicated over the connection 104b during one or more time periods. A time period may be, for example, an hour, day, week, month, year, and/or billing period (e.g., the billing period for subscriber's contract with an ISP). In some instances, the total amount of traffic may include only traffic that counts towards a subscriber's periodic allotment. For example, the ISP that provides connection 104a may impose a monthly data cap of 250 GB, but only DOCSIS data may count toward that allotment while cable television programming may not count toward the 250 GB allotment.

The collected information may include, for example, the traffic load on one or both of the connections 104a and 104b. For example, a current instantaneous traffic load and/or an average traffic load over a current, in-progress time period may be collected for each of the connections 104a and 104b.

The base station manager 114 may collect (e.g., via a logical management interface accessible by the base stations 102a and 102, the components 112, and/or other devices) information about the connections 104a and/or 104b through the communication of management messages with other network devices (e.g., the base stations 102a and 102b, devices in the access networks 106a and 106b, and/or devices in the core network 110). For example, other devices may collect information as traffic arrives at and/or traverses them. Such devices may communicate such collected information to the base station manager 114 on a periodic or event-driven basis (e.g., in response to a request from the base station manager 114). Additionally or alternatively, the management messages may comprise probe messages utilized to measure various network information.

In operation, the base stations 102a and 102b may communicate data to and/or from mobile devices (e.g., 202a and 202b) utilizing cellular protocols (e.g., LTE). Such data may be backhauled to and/or from the core network 110 via a respective one of network connections 104a and 104b. Values of one or more parameters utilized by the base stations 102a and 102b may be configured by the base station manager 114 in order to manage respective traffic loads on the base stations 102a and 102b. The configuration of the parameters may be based on collected information about the respective traffic loads on the backhaul connections 104a and 104b.

The collected information may be utilized to determine the load state of the connections 104a and 104b. That is, utilized to determine a traffic load on each of the connections 104a and 104b, and to categorize those loads into one of a finite number of load states. Such categorization may be accomplished by comparing the traffic loads to one or more thresholds. In a single threshold implementation, for example, a connection may be determined to be first load state (e.g., a "congested" state) if its traffic load exceeds the threshold and in a second load state (e.g., a "not congested" state) if its traffic load is below the threshold. The determination of a load state of the connections 104a and 104b may, for example, be made periodically and/or made occasionally in response to a triggering event or condition.

In an example single-threshold implementation, the threshold for categorizing a load state may, for example, be calculated as shown below in EQ 1.

$$LT=(D-B)/T \quad \text{EQ. 1}$$

where 'LT' is the load threshold measured in bits per unit time, 'D' is the periodic data cap measured in bits, 'B' is the total amount of data consumed over the connection during the current time period (measured in bits), and 'T' is the amount of time remaining in the current time period. In such an instance, the connection may be determined to be in a first load state if the traffic load is greater than LT and a second load state if the traffic load is less than LT.

In an example N-threshold implementation (where N is an integer greater than 1), the thresholds for determining a load state may, for example, be calculated as shown below in EQ 2.

$$[LT_1, LT_2, \ldots LT_N]=((D-B)/T)[S_1, S_2, \ldots S_N] \quad \text{EQ. 2}$$

where '$[LT_1, LT_2, \ldots LT_N]$' is an array of N load thresholds measured in bits per unit time, 'D' is the periodic data cap measured in bits, 'B' is the total amount of data consumed over the connection during the current time period (measured in bits), 'T' is the amount of time remaining in the current time period, and $[S_1, S_2, \ldots S_N]$ is an array of scaling factors where $S_1 > S_2 > \ldots > S_N$. For example, if N=2, then a load greater than $LT_1$ may correspond to a first load state, a load between $LT_1$ and $LT_2$ may correspond to a second load state (a relatively lower traffic load than the first state), and a load below $LT_2$ may correspond to a third load state (a relatively lower traffic load than the second load state).

In an example single-threshold implementation, the threshold for categorizing a load state may, for example, be calculated as shown below in EQ 3.

$$LT=(S)(M) \quad \text{EQ. 3}$$

where 'LT' is the load threshold measured in bits per unit time, 'S' is a scaling factor, and 'M' is a maximum permitted load of the connection.

In an example N-threshold implementation (where N is an integer greater than 1), the thresholds for determining a load state may, for example, be calculated as shown below in EQ 4.

$$[LT_1, LT_2, \ldots LT_N]=[S_1, S_2, \ldots S_N](M) \quad \text{EQ. 4}$$

where '$[LT_1, LT_2, \ldots LT_N]$' is an array of N load thresholds measured in bits per unit time, "M" is a maximum permitted load of the connection, and $[S_1, S_2, \ldots S_N]$ is an array of scaling factors where $S_1 > S_2 > \ldots > S_N$. For example, if M=2, then a load greater than $LT_1$ may correspond to a first load state, a load between $LT_1$ and $LT_2$ may correspond to a second load state (a relatively lower traffic load than the first state), and a load below $LT_2$ may correspond to a third load state (a relatively lower traffic load than the second load state).

Figure 1B:
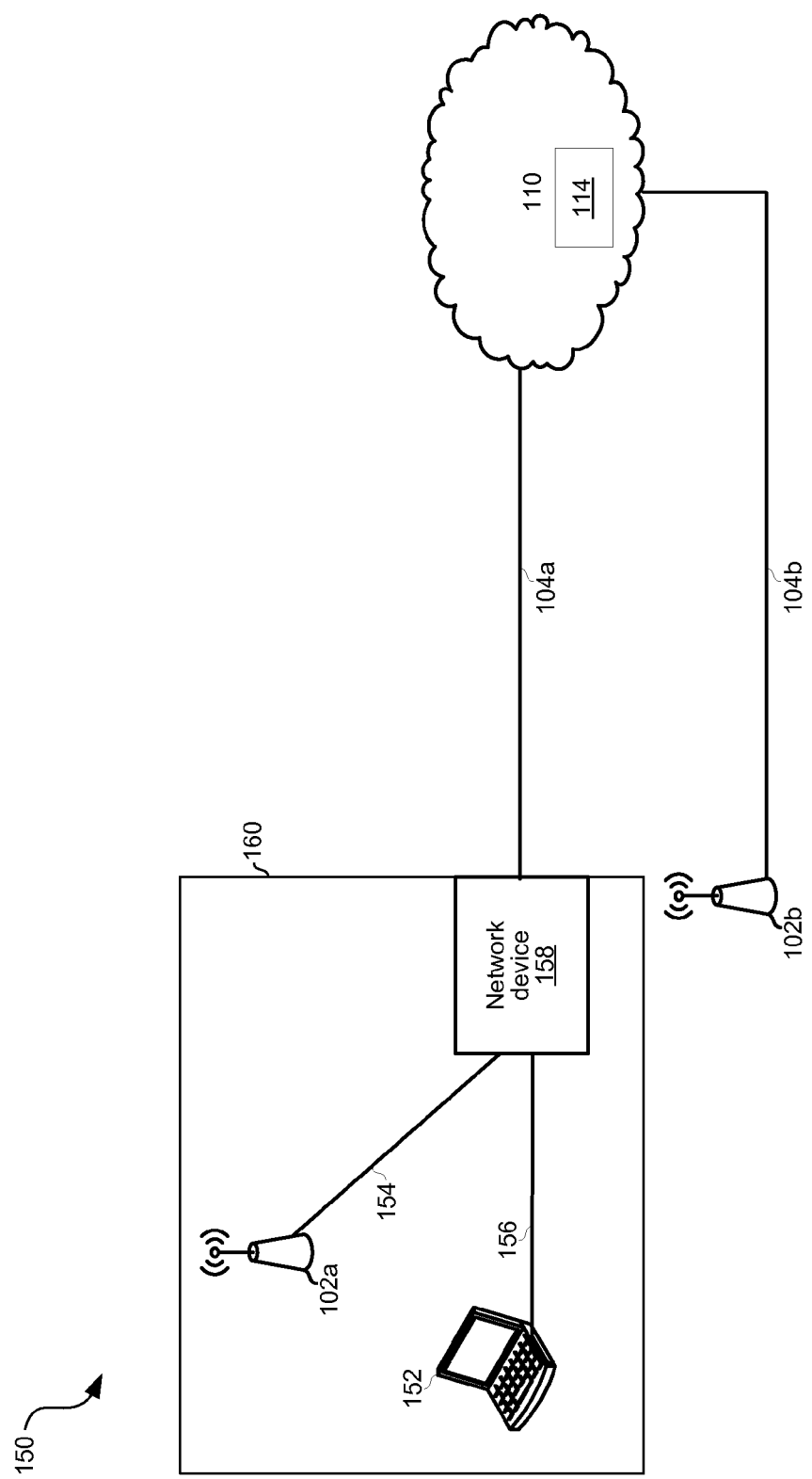
FIG. 1B depicts an example of a network comprising a plurality of small-cell base stations.

FIG. 1B depicts an example of a network comprising a plurality of small-cell base stations. In the network 150 depicted in FIG. 1B, again shown are the base stations 102a and 102b, the connections 104a and 104b, the subnetwork 110, and the base station manager 114. Additionally, network devices 152 and 158 and network links 154 and 156 are shown.

The network device 152 may comprise a non-base station device such as, for example, a laptop or desktop computer that is not configured to function as a base station. The device 152 may reside within a premises 160 (e.g., a residence, business or public venue) along with the base station 102a. The device 152 may comprise circuitry operable to implement functions of the network device 152 described herein.

The network device 158 may comprise a non-base station device such as, for example, a router or network switch that is not configured to function as a base station, which may communicate with the base station 102a and non-base station device 152 via network links 154 and 156 respectively. The network device 158 may reside within the premises 160 along with the base station 102a. The network device 158 may comprise circuitry operable to implement functions of the network device 158 described herein.

The connection 104a may provide an Internet connection to the premises 160. Thus, the connection 104a may carry data to and/or from both the base station 102a and the non-base station device 152. Data to and/or from the network device 152 may comprise, for example, website data, file uploads, file downloads, and/or any other traffic which a residence and/or business may communicate to and/or from the Internet. Because data to and/or from the base station 102a shares the connection 104a with data to and/or from the non-base station device 152, the latter may be accounted for by the base station manager 114 when collecting information about the connection 104a and/or when determining a load state of the connection 104a. For example, where the respective cellular traffic loads on the base stations 102a and 102b are roughly equal, but device 152 is generating a lot of traffic, connection 104a may be in a more-heavily loaded state than connection 104b. Accordingly, the base station manager 114 may take action to redistribute the existing loads (e.g., through handovers and/or traffic filtering) and/or to balance the respective loads going forward (e.g., encourage or force new connections to be established with the base station 102b rather than the base station 102, where possible).

In addition to routing/switching/bridging traffic between the connection 104a and the links 154 and 156, the network device 158 may perform and/or aid in the collection of information about the connection 104a. In this regard, the network device 158 may be a component of the base station manager 114 and/or may exchange network management messages with the base station manager 114.

FIG. 1C is a block diagram of an example base station manager. In the example implementation depicted, the circuitry of the base station manager 114 comprises a transceiver 116, a CPU 118, and a memory 120.

The transceiver 116 may be operable to communicate in accordance with one or more communications protocols for communicating over wired, wireless, and/or optical links. The transceiver 116 may, for example, communicate utilizing the Internet protocol suite (including TCP and/or IP).

The CPU 118 may be operable to effectuate operation of the base station manager 114 by executing lines of code stored in the memory 120. Such lines of code may include, for example, one or more programs for implementing an interface for collecting and analyzing network information to generate decisions regarding the management of network traffic.

The memory 120 may comprise program memory, runtime memory, and/or mass storage. The memory 120 may, for example, comprise non-volatile memory, volatile memory, read only memory (ROM), random access memory (RAM), flash memory, magnetic storage, and/or any other suitable memory. Program memory may store lines of code executable by the CPU 118 to effectuate operation of network management actions. Runtime memory may store data generated and/or used during execution of the network management programs. For example, runtime memory may store values utilized in evaluating, and/or the results of evaluating, equations 1-3 above. Mass storage may, for example, store data that becomes too large for efficient storage in runtime memory. For example, collected information regarding connections 104a and 104b may be stored in mass storage in a data structure 122 and portions of that data may be loaded into runtime memory as needed. An example of the data structure 122 is described below with reference to FIG. 1D.

Figure 1D:
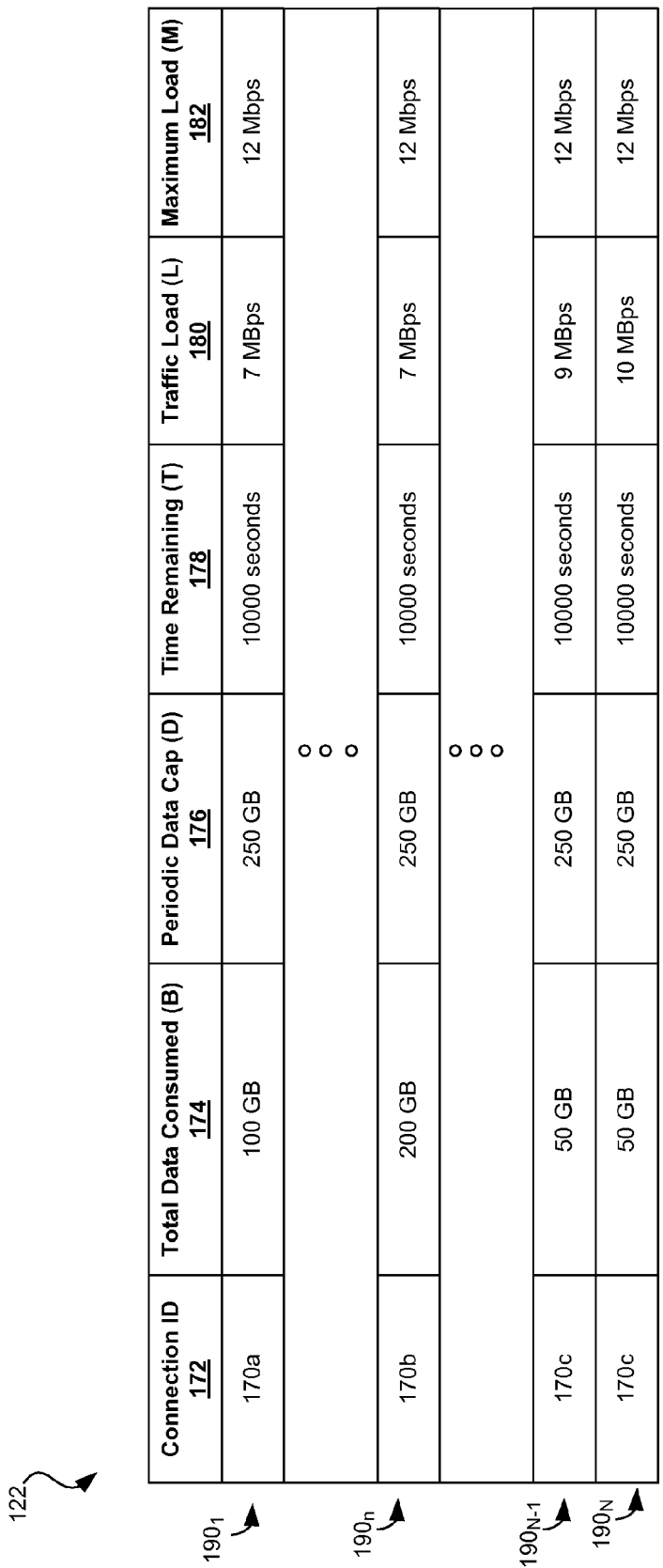
FIG. 1D is an example of a data structure utilized for load distribution in a network of small-cell base stations.

FIG. 1D is an example of a data structure utilized for load distribution in a network of small-cell base stations. Each of the entries $190_1$-$190_N$ (where 'N' is an integer and 'n' is a value between 1 and 'N') in the data structure 122 is associated with a particular backhaul connection and comprises current conditions of (e.g., traffic load) and/or constraints on (e.g., data rate limit and/or periodic data cap) the particular backhaul connection. In the implementation depicted, each entry $190_n$ comprises: a field 172 which stores an identifier associated with a particular backhaul connection, a field 174 which stores the total amount of data consumed over the connection during a time period (e.g., the current month or a previous month), a field 176 which stores the periodic data cap imposed on the connection, a field 178 which stores an amount of time left in the time period, a field 180 which stores a traffic load on the connection, and a field 182 which stores a maximum load imposed on the connection. Each of the fields in FIG. 1D is populated with arbitrary values to illustrate how the stored values may be utilized to determine a load state of a connection.

Table 1 below illustrates example load state determinations made utilizing equation 1 above.

TABLE 1

| Load State Determination using EQ. 1 | | | |
|---|---|---|---|
| Connection | LT | L | Load state |
| 170a | 15 MBps | 7 MBps | Not congested |
| 170b | 5 MBps | 7 MBps | Congested |
| 170c | 20 MBps | 9 MBps | Not congested |
| 170d | 20 MBps | 10 MBps | Not congested |

Thus, table 1 illustrates an example scenario in which connection 170b is determined to be congested as a result of the fact that, based on its traffic load, L, the connection 170b will exceed its periodic data cap for the time period. The consequences of exceeding the data cap may depend on policies of the service provider that provides the connection 170c, but such consequences could include, for example, the connection 170c being disabled or a data rate of the connection 170c being throttled down. The loss of connection 170c would result in a base station that is backhauled by the connection 170c being unable to provide service to mobile devices. This, in turn, could result in a "hole" or "dead zone" in the cellular provider's coverage. Accordingly, the base station manager 114 may take action to attempt to reduce the load on the connection 170c.

Table 2 below illustrates example load state determinations utilizing equation 3 above and a hypothetical scaling factor, S, of 0.8. The scaling factor may be configured by the cellular provider based, for example, on performance data (e.g., load variance, traffic latency, dropped packets, etc.). By using a scaling factor 0.8, 20% headroom is reserved for handling transient traffic spikes, for example.

TABLE 2

| Load State Determination using EQ. 3 | | | |
|---|---|---|---|
| Connection | (S)(M) | L | Load State |
| 170a | 9.6 MBps | 7 MBps | Not congested |
| 170b | 9.6 MBps | 7 MBps | Not congested |
| 170c | 9.6 MBps | 9 MBps | Not congested |
| 170d | 9.6 MBps | 10 MBps | Congested |

Thus, table 2 illustrates an example scenario in which connection 170d is determined to be congested as a result of the fact that its traffic load exceeds 80% of its maximum permitted load. Operating with a load above (S)(M) could, for example, increase latency and/or the likelihood of dropped packets, which may negatively impact the experience of mobile device users.

Figure 2B:
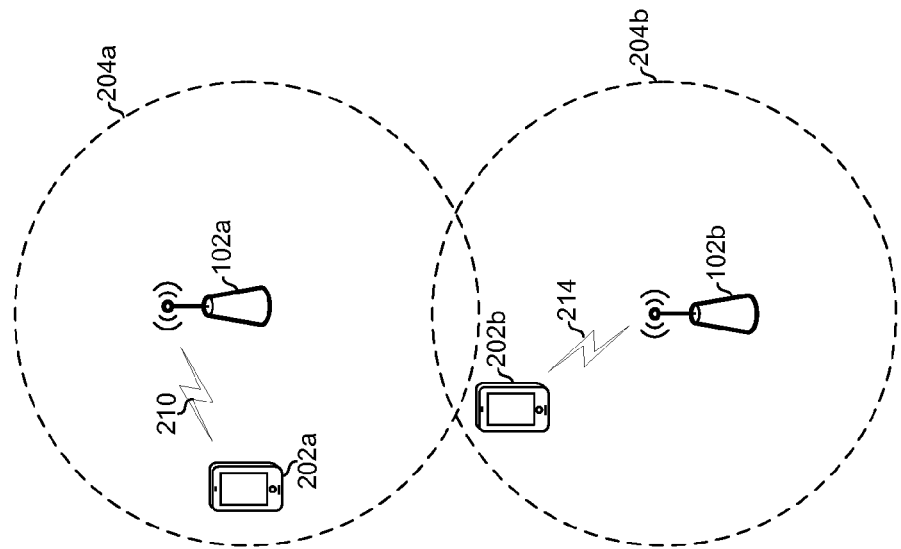
FIGS. 2A and 2B illustrate reconfiguration of a cell boundary in response to one backhaul connection becoming more-heavily loaded than another.
Figure 2A:
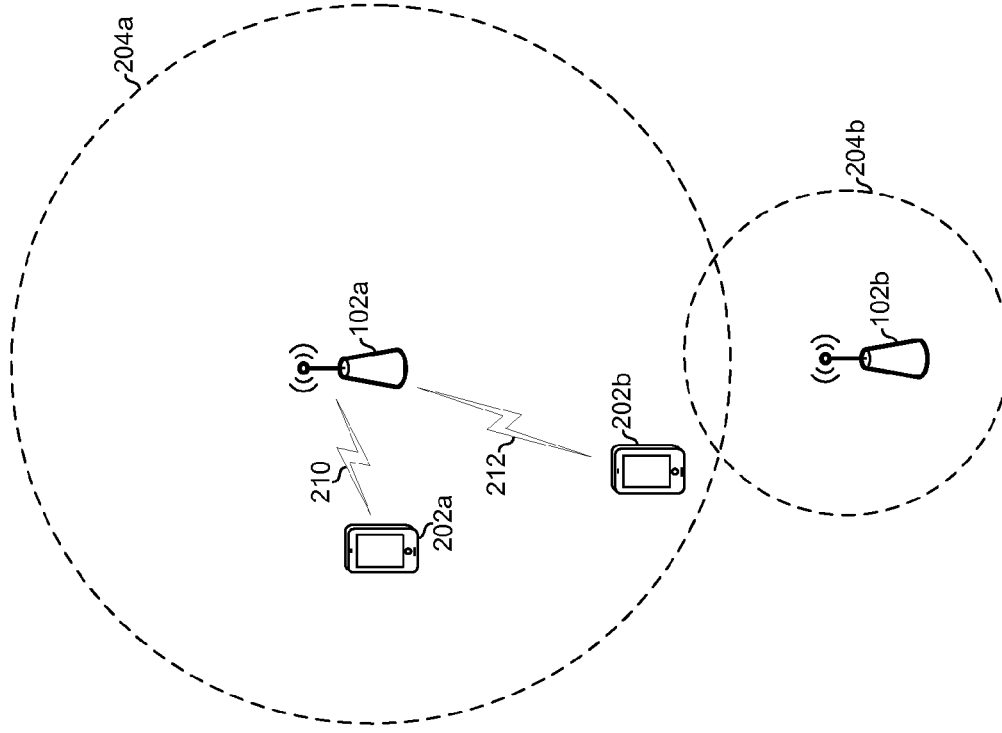

FIGS. 2A and 2B illustrate reconfiguration of a cell boundary in response to one backhaul connection becoming more-heavily loaded than another. In FIG. 2A, there is shown the base station 102a, the base station 102b, a coverage area 204a of the base station 102a, a coverage area 204b of the base station 102b, and mobile devices 202a and 202b.

Each of the mobile devices 202a and 202b may comprise circuitry operable to communicate utilizing one or more wireless protocols (e.g., LTE protocols). Each of the mobile devices 202a and 202b may be, for example, a cellphone, a tablet computer, or a laptop computer.

In FIG. 2A, the base station 102a is serving mobile device 202a via a wireless connection 210 and serving mobile device 202b via a wireless connection 212. For illustration, assume that connection 104a to the base station 102a is more heavily loaded, as a result of the traffic to and/or from the mobile devices 202a and 202b and/or other traffic from non-base station devices on the connection 104a, than the connection 104b serving base station 102b. The base station manager 114 may detect that the imbalance in the traffic loads on connections 104a and 104b. FIG. 2B illustrates an example response of the network manager to the detected imbalance in the traffic loads on the connections 104a and 104b. Specifically, FIG. 2B illustrates a response in which the base station manager 114 reconfigures one or more parameter values to cause the coverage areas 204a and 204b to be altered.

In an example implementation, the imbalance in traffic loads may need to be greater than a threshold, $I_{TH}$, before the base station manager 114 detects the imbalance and/or determines to take action to correct the imbalance. Additionally and/or alternatively, temporal hysteresis may be utilized to prevent oscillations and/or rapid changes in network configuration. The threshold may be predetermined and/or determined real-time by the network manager 114. The threshold may be determined based, for example, on historical data consumption patterns in the network.

Moving from FIG. 2A to FIG. 2B, the reconfiguring results in the mobile device 202b being handed-over to the base station 102b such that the mobile device 202b is now serviced via the connection 214 to base station 102b. After the handover, traffic to and from the mobile device 202b is backhauled over connection 104b rather than connection 104a, resulting in the total traffic load being more-evenly distributed across connections 104a and 104b.

Figure 3A:
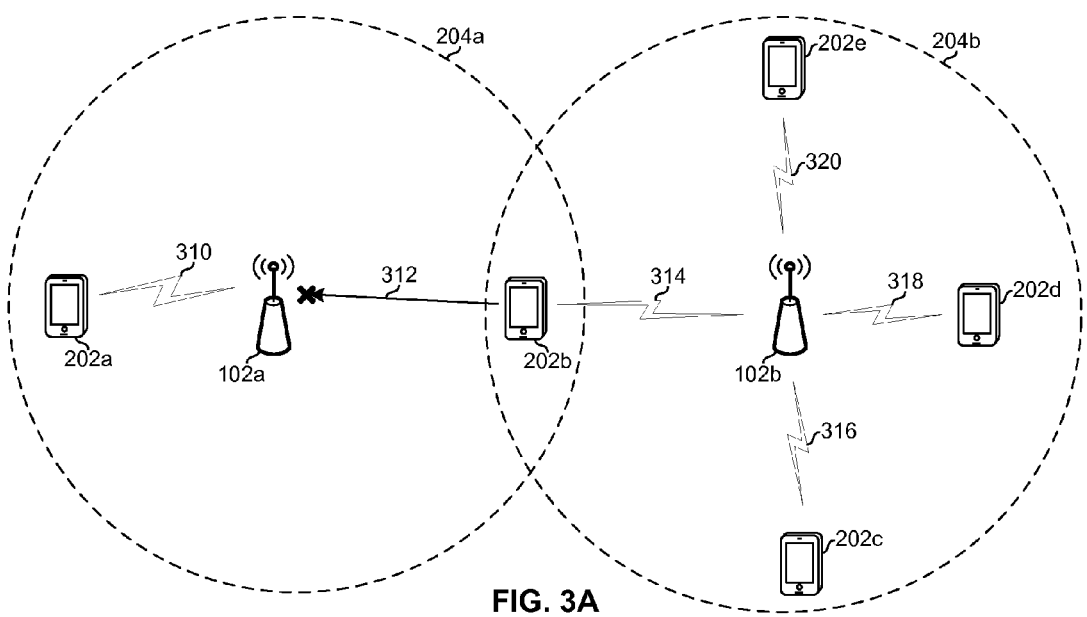
FIGS. 3A and 3B illustrate an example configuration and reconfiguration of parameter values to traffic load distribution in a network of small-cell base stations.
Figure 3B:
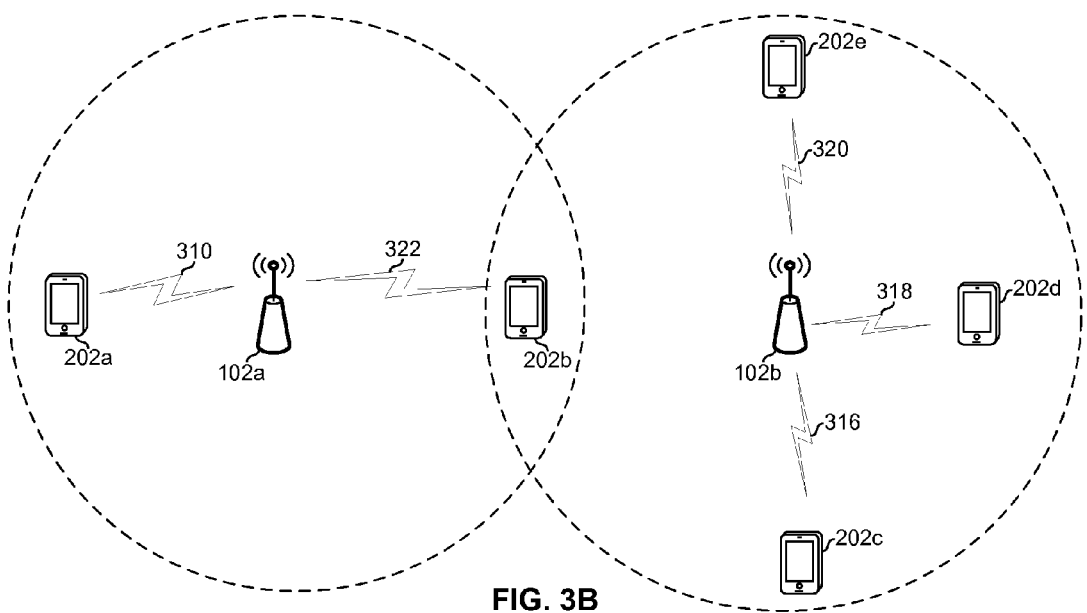

FIGS. 3A and 3B illustrate an example configuration and reconfiguration of parameter values for traffic load distribution in a network of small-cell base stations. In FIG. 3A, there is shown the base station 102a and its coverage area 204a, the base station 102b and its coverage area 204b, and mobile devices 202a-202e.

Each of the mobile devices 202a-202e may comprise circuitry operable to communicate utilizing one or more wireless protocols (e.g., LTE protocols). Each of the mobile devices 202a-202e may be, for example, a cellphone, a tablet computer, or a laptop computer.

In FIG. 3A, the base station 102a is serving mobile device 202a via a wireless connection 310 and base station 102b is serving mobile devices 202b-202e via connections 314, 316, 318, and 320, respectively. For illustration, assume that connection 104a (see FIG. 1A) to the base station 102a is more heavily loaded, as a result of the traffic to and/or from mobile device 202a and other traffic from non-base station devices on the connection 104a, than the connection 104b (see FIG. 1A) serving base station 102b (e.g., because connection 104b is not carrying a high amount of traffic from non-base station devices). The base station manager 114 may detect the imbalance in the traffic loads on connections 104a and 104b. FIG. 3A illustrates an example response of the network manager to these detected conditions. Specifically, FIG. 3A illustrates a response in which the base station manager 114 configures one or more parameter values of the base station 102a such that association of the mobile device 202b with the base station 102a is prevented (e.g., a request 312 from mobile device 202b may be dropped and/or responded-to with a denial) because allowing the handover would only exacerbate the load imbalance.

Moving from FIG. 3A to FIG. 3B, assume now that the connection 104b has now become more heavily loaded than connection 104a. The base station manager 114 may detect this imbalance. FIG. 3B illustrates an example response of the network manager to these detected conditions. Specifically, FIG. 3B illustrates a response in which the base station manager 114 configures one or more parameter values of the base station 102a such that the base station 102a is configured to accept handovers from base station 102b, and may configure one or more parameters of the base station 102a and/or 102b such that handover occurs. For example, a transmit power utilized for the connection 314 may be reduced such that the mobile device 202b determines that associating with the base station 102a will provide better performance.

In an example implementation, the parameters associated with connection 314 may be configured without affecting the connections 316, 318, and 320. For example, transmit power may only be decreased for a channel (e.g., frequency, timeslot, and/or CDMA code) associated with the connection 314 while transmit power for channel(s) associated with the connections 316, 318, and 320 may remain the same.

Figure 4:
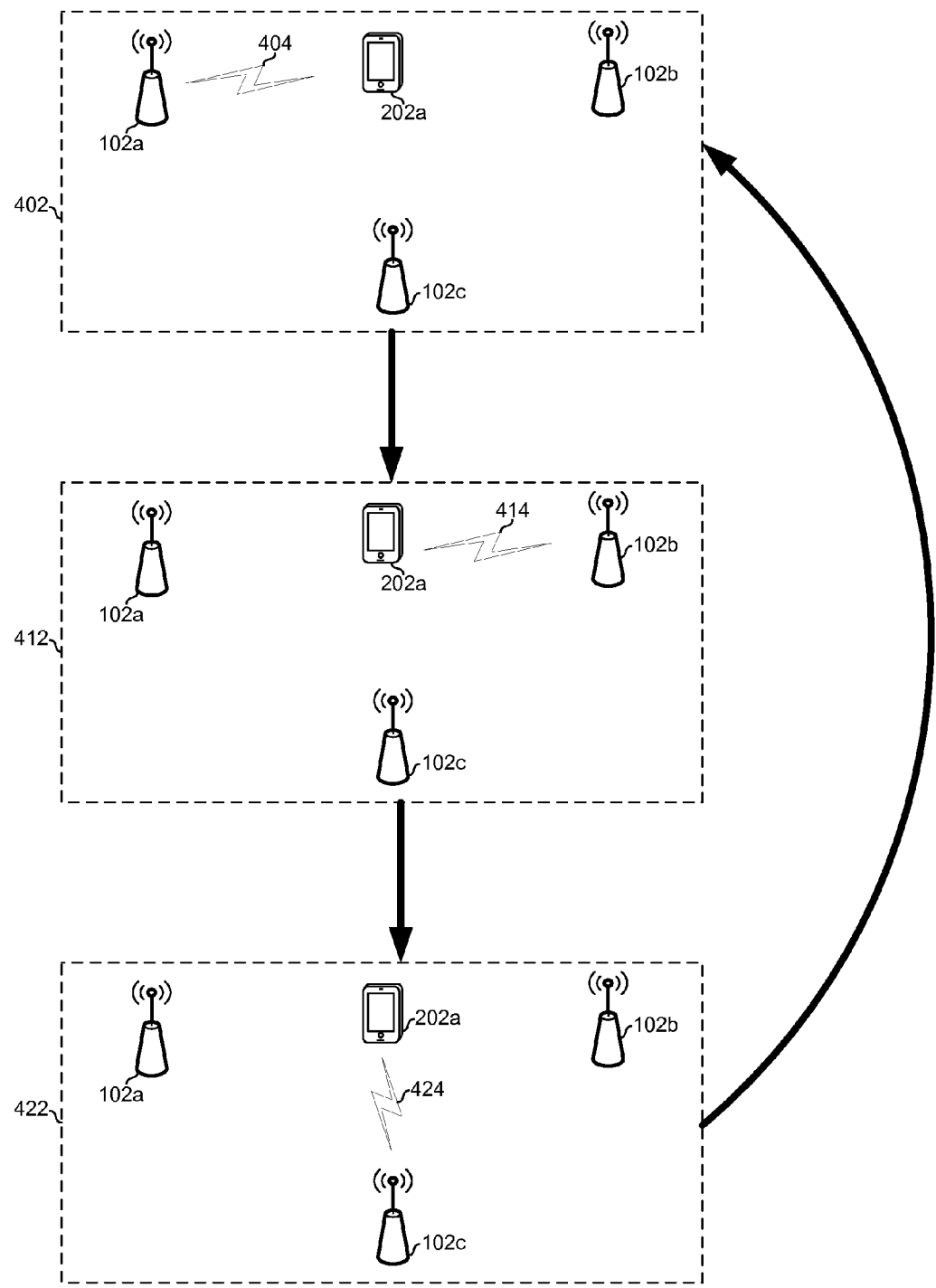
FIG. 4 illustrates a cyclical handing over of a mobile device for traffic load distribution among a plurality of backhaul connections.

FIG. 4 illustrates a cyclical handing over of a mobile device for traffic load distribution among a plurality of backhaul connections. Shown in FIG. 4, are three network states 402, 412, and 422, which differ in the base station that service mobile device 202a. The data consumption of the mobile device 202a (and other devices in the network not shown in FIG. 4) may be such that whichever backhaul connection handles traffic for mobile device 202a, that backhaul connection is going to be more heavily loaded than the other two backhaul connections. Accordingly, the network manager 114 may cause the mobile device 202a to be cyclically handed-over among the three base stations 102a, 102b, and 102c (i.e., from base station 102a (state 204), to base station 102b (state 412), to base station 102c (state 422), back to state 102a, and so on). The amount of time spent in each of the three states may be predetermined and/or determined in real-time by the network manager 114. The amount of time may be determined based, for example, on historical data consumption patterns in the network. Where, there are only two base stations, cyclical handing over equates to repeated hand-offs back and forth between the two base stations.

Figure 5:
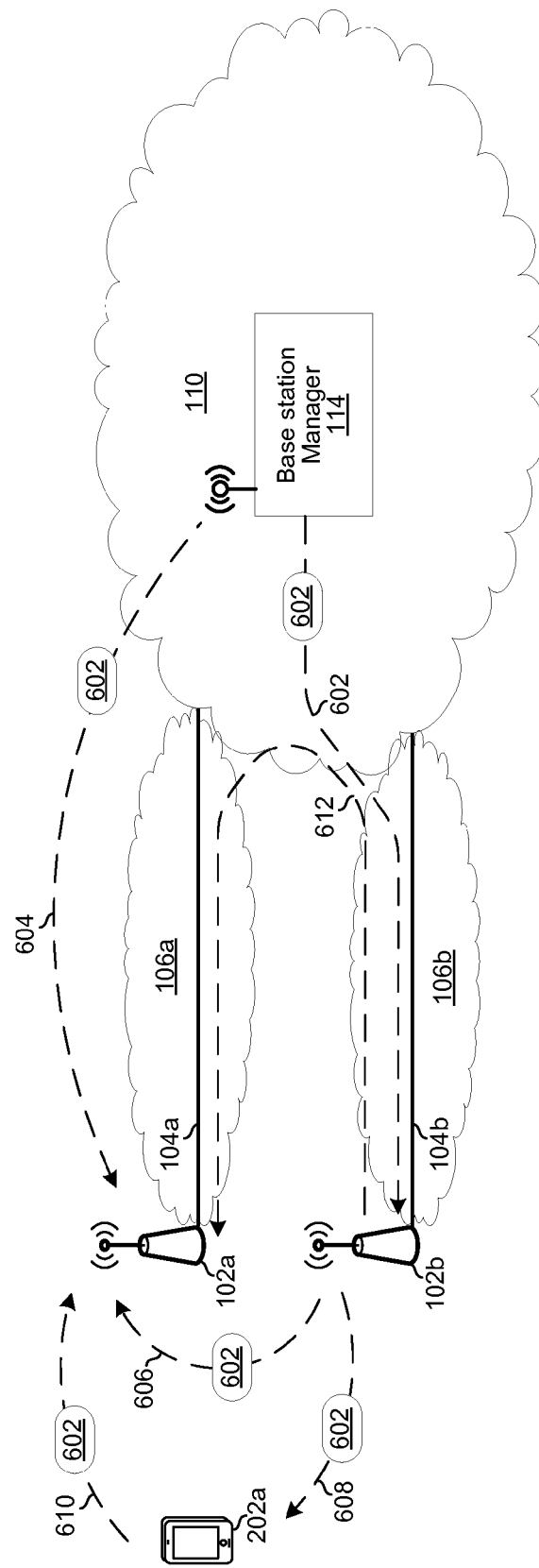
FIG. 5 illustrates communication of network management messages for managing traffic loads on backhaul connections of small-cell base stations.

FIG. 5 illustrates communication of network management messages for managing traffic loads on backhaul connections of small-cell base stations. Again shown in FIG. 5 is the network 100 shown in FIG. 1. Also shown are various paths via which network management messages 602 may be communicated. The paths shown in FIG. 5 are merely examples of paths via which various devices of the network 100 may interface with one another. Any one or more of the paths shown in FIG. 5 may not be present in a particular embodiment. In a particular embodiment, any one or more of the paths shown as wired may additionally or alternatively comprise wired and/or optical links. In a particular embodiment, any one or more of the paths shown as wireless may additionally or alternatively comprise wireless and/or optical links.

The path 602 is a wired, wireless, and/or optical path between the network manager 114 and the base station 102b. The path 602 may comprise one or more hops and includes the backhaul connection 104b. The path 604 is a wireless path between the base station manager 114 and the base station 102a. The path 604 is thus out-of-band with the backhaul connection 104a that serves base station 102a. The path 606 is a wireless path between base stations 102a and 102b. The path 608 is a wireless path between the base station 102b and the mobile device 202a. The path 610 is a wireless path between the mobile device 202a and the base station 102a. Messages sent over the path 608 may be forwarded onto the path 610. The path 612 is a wired, wireless, and/or optical path between base stations 102a and 102b. The path 612 may comprise one or more hops and includes the backhaul connections 104a and 104b.

Figure 6:
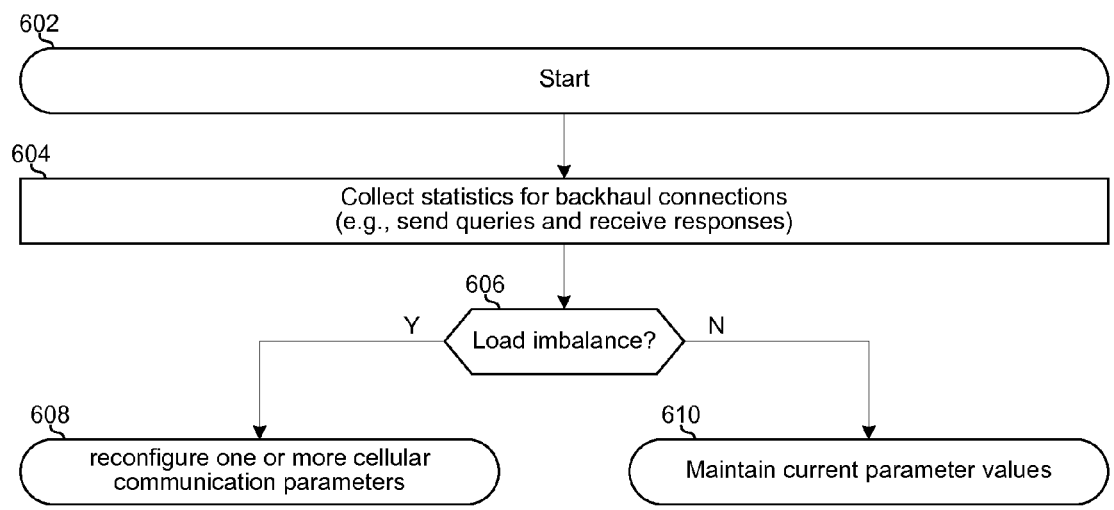
FIG. 6 is a flowchart illustrating steps for load distribution in a network of small-cell base stations.

FIG. 6 is a flowchart illustrating steps for load distribution in a network of small-cell base stations. In step 604, after start step 602, the base station manager 114 may collect information about one or more connections which serve as backhaul connections for one or more small-cell base stations. The collected information may include the information depicted in FIG. 1D and/or may include other information. The information may, for example, be collected via a series of queries and responses sent by the base station manager 114 to other devices in the network and corresponding responses received by the base station manger 114 from the queried devices. In step 606, the collected information may be utilized to determine whether there is a significant (e.g., greater than a threshold amount) imbalance in the loads carried by one or more backhaul connections of the network. The determination in step 606 may, for example, be made utilizing equations 1, 2, 3, and/or 4 described above. If a significant imbalance is detected, then in step 608, one or more parameter values may be configured to, for example, reduce a load on heavily-loaded connection(s), shift traffic from heavily-loaded connection(s) to lightly-loaded connection(s), and/or prevent the imbalance from worsening (e.g., prevent new cellular connections that will be backhauled over the heavily loaded connection(s)). Returning to step 606, if there is not a significant imbalance, the steps may advance to step 610 and a current configuration of the network may be maintained.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for load distribution in a network of small-cell base stations.

Accordingly, the present method and/or apparatus may be realized in hardware, software, or a combination of hardware and software. The present method and/or apparatus may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or apparatus may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method comprising:
   in a network device of a first service provider, determining that a first backhaul connection, which serves a first base station, is congested and that a second backhaul connection, which serves a second base station, is not congested, the determining being made based on a first periodic data cap imposed on the first backhaul connection, a traffic load on the first backhaul connection, a second periodic data cap imposed on the second backhaul connection, and a traffic load on the second backhaul connection;
   in response to determining that the first backhaul connection is congested and the second backhaul connection is not congested, configuring a value of a cellular communication parameter utilized by one or both of the first base station and the second base station, the configuring the value of the cellular communication parameter comprising periodic adjustments of the value of the cellular communication parameter that causes one or more mobile devices to be repeatedly handed-over between the first base station and the second base station.

2. The method of claim 1, further comprising retrieving the first periodic data cap and the second periodic data cap from a database that stores constraints on backhaul connections.

3. A method comprising:
   performing by a network device:
   determining a load state of each of a plurality of network connections, wherein:
      each of the plurality of network connections backhauls a respective one of a plurality of base stations; and
      for each one of the plurality of network connections, the determining of the load state is based on a periodic data cap imposed on the one of the plurality of network connections; and
   configuring one or more of the plurality of base stations based on the determined load state of each of the plurality of network connections, the configuring one or more of the plurality of base stations comprising periodically adjusting of one or more parameter values, the periodic adjusting of one or more parameter values causing one or more mobile devices to be cyclically handed-over among the plurality of base stations.

4. The method of claim 3, wherein the configuring one or more of the plurality of base stations comprises adjusting a value of a parameter such that traffic is redistributed from a more-heavily-loaded one of the plurality of network connections to a less-heavily-loaded one of the plurality of network connections.

5. The method of claim 4, wherein said parameter comprises one or more of the following: minimum quality of service (QoS) level, whether to accept inbound handovers, or whether to initiate outbound handovers.

6. The method of claim 3, wherein the configuring one or more of the plurality of base stations comprises one or both of:
   reducing a power at which the one or more of the plurality of base stations transmit on a cellular channel; and
   decreasing a sensitivity with which the one or more of the plurality of base stations listen on a cellular channel.

7. The method of claim 3, wherein the configuring one or more of the plurality of base stations comprises transmitting one or more network management messages over one or both of:
   the plurality of backhaul connections; and
   one or more connections that are out-of-band with the plurality of backhaul connections.

8. The method of claim 3, wherein the configuring one or more of the plurality of base stations results in a handover of a mobile device from a first one of the plurality of the base stations to a second one of the plurality of the base stations.

9. The method of claim 3, wherein:
   cellular connections handled by the plurality of base stations are associated with one or more first service providers; and
   the plurality of network connections are associated with one or more second service providers.

10. The method of claim 3, wherein one or more of the plurality of network connections carry data communicated between non-base station devices in addition to carrying data communicated to and/or from a respective one of the plurality of base stations.

11. A system comprising:
   a network device operable to:
   determine a load state of each of a plurality of network connections, wherein:

each of the plurality of network connections backhauls a respective one of a plurality of base stations; and for each one of the plurality of network connections, the determining of the load state is based on a periodic data cap imposed on the one of the plurality of network connections; and configure one or more of the plurality of base stations based on the determined load state, the configuration of one or more of the plurality of base stations comprising periodic adjustments of one or more parameter values, the periodic adjustments of one or more parameter values causing one or more mobile devices to be cyclically handed-over among the plurality of base stations.

12. The system of claim 11, wherein the configuring comprises adjusting a value of a parameter such that traffic is redistributed from a more-heavily-loaded one of the plurality of network connections to a less-heavily-loaded one of the plurality of network connections.

13. The system of claim 11, wherein the configuration of one or more of the plurality of base stations comprises one or both of:

a reduction of a power at which the one or more of the plurality of base stations transmit on a cellular channel; and a reduction of a sensitivity with which the one or more of the plurality of base stations listen on a cellular channel.

14. The system of claim 11, wherein the configuration of one or more of the plurality of base stations comprises configuration of a value of one or more of the following parameters: minimum quality of service (QoS) level, whether to accept inbound handovers, whether to initiate outbound handovers.

15. The system of claim 11, wherein the configuration of one or more of the plurality of base stations comprises transmission of one or more network management messages over one or both of:

the plurality of backhaul connections; and one or more connections that are out-of-band with the plurality of backhaul connections.

16. The system of claim 11, wherein the configuration of one or more of the plurality of base stations results in a handover of a mobile device from a first one of the plurality of the base stations to a second one of the plurality of the base stations.

17. The system of claim 11, wherein:

cellular connections handled by the plurality of base stations are associated with one or more first service providers; and the plurality of network connections are associated with one or more second service providers.

18. The system of claim 11, wherein one or more of the plurality of network connections carry data communicated between non-base station devices in addition to carrying data communicated to and/or from a respective one of the plurality of base stations.

* * * * *